July 19, 1938.  M. BILINSKI  2,124,227

TRAP

Filed Nov. 24, 1936

INVENTOR
Michael Bilinski
ATTORNEY

Patented July 19, 1938

2,124,227

UNITED STATES PATENT OFFICE 2,124,227

TRAP

Michael Bilinski, Ottawa, Ontario, Canada

Application November 24, 1936, Serial No. 112,559

5 Claims. (Cl. 43—81)

This invention relates to improvements in a trap for rodents and the like and appertains particularly to one comprising a base, a striking member and a spring stretched therebetween.

An object of this invention is to provide a trap having improved means for operating the striking member, as for instance the setting and/or releasing of said striking member.

A further object of the invention is to provide a trap having an improved means for setting the striking member which is shaped as a U with outturned ends, by forming a crank piece integrally on one of the said outturned ends.

A further object of the invention is to provide a trap of the character described in which the striking member sets against the upstanding arm of an angle trip or platform; the other arm being substantially horizontal and designed to hold the bait.

A further object of the invention is to provide a trap whose spring actuated striking member, when set, is designed to stand on dead centre, or substantially so, and adapted to be tripped by a floating angle platform that may be suspended from the raised sides of the trap.

A still further object of the invention is the provision of a trap of the nature and for the purpose set forth, that is characterized by structural simplicity and durability, operating efficiency and relatively low cost of production whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1:
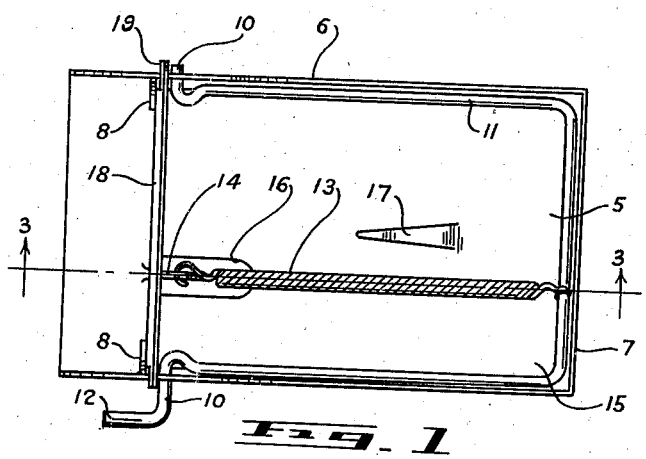
Figure 1 is a plan of my improved trap.
Figure 3:
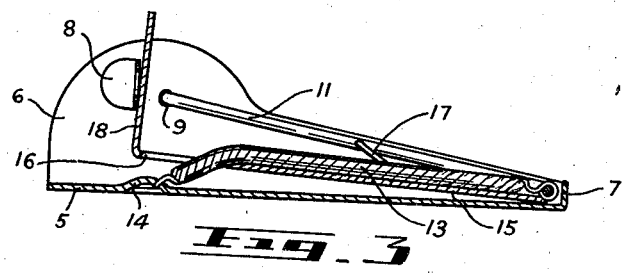
Figure 3 is a vertical longitudinal section, as on the line 3—3 of Figure 1.
Figure 2:
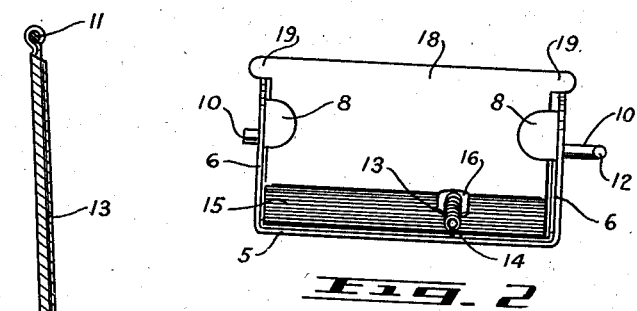
Figure 2 is an end elevation.
Figure 4:
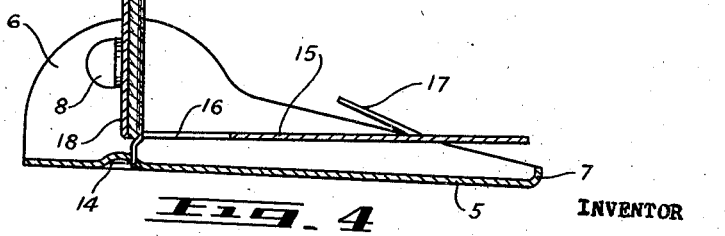
Figure 4 is a similar section showing the trap in set position.

The trap comprises a base 5, with upturned sides or wings 6, like semicircular lobes tapering toward the front 7 that has a shallow bent up edge. From each side 6, near the back, a stop 8 is struck inwards and just in advance of these stops each side has a perforation 9 to receive the outturned ends 10 of the U-shaped striking member 11. One of these ends 10 has an offset or crank arm 12 for manual engagement in setting the trap.

For actuating the striking U-member 11, a coil spring 13 is stretched between the cross piece of the U member and a pressed-in anchor eye 14 in the base.

An angle platform 15 is employed to trip the set striking member 11. It has a slot 16 to accommodate the spring 13 that passes through it and, in addition to the substantially horizontal platform portion that overlies the most of the base of the trap and includes an upstruck bait holding prong 17, comprises also the substantially vertical rear or angle portion 18 that lies between the outturned ends 10 of the striking member 11 and the instruck stops 8, and has ears 19 that project over and ride on the lobes of the sides 6.

As the U-shaped striking member 11 is set, by manipulation of the handle 12, it and/or the stretched spring 13 engages the rear angle portion 18 of the tripping platform, moving the same back against the stops 8 and hinging or tilting up the substantially horizontal bait holding platform portion 15. In this position the striking member stands substantially on dead centre so that only the minimum force that is practical is required to overcome inertia, friction or other resistance to its springing.

From the foregoing description taken in connection with the accompanying drawing, it will be manifest that a trap for rodents and the like is provided that will fulfil all the necessary requirements of such a device, but as many changes could be made in the above description and many apparently widely different embodiments of the invention may be constructed within the scope of the appended claims without departing from the spirit or scope thereof, it is intended that all matters contained in the said accompanying specification and drawing, shall be interpreted as illustrative and not in a limitative or restrictive sense.

Having thus described the invention, what is claimed as new is:

1. A trap comprising a base with upturned sides, stops struck in from said sides, a U-shaped striking member with outturned ends pivoted in said upturned sides, and an angle platform overlying said base with an upturned end between the outturned ends of said striking member and said stops.

2. In combination with claim 1, said angle platform having lugs on opposite sides at the top of said upturned end extending over the upturned sides of said base.

3. A trap comprising a base with upturned sides, a spring actuated striking member pivoted therein, and a trip for said striking member formed as a platform with an upturned end from opposite sides of which supporting lugs extend outwardly over said upturned sides.

4. A trap comprising a base with upturned sides formed like semi-circular lobes that taper toward the front, a spring actuated striking member pivoted therein, and a trip for said striking member formed as a platform with an upturned end from opposite sides of the top of which supporting lugs extend outwardly over said upturned sides to ride on said semi-circular lobes and suspend said platform above said base.

5. A trap comprising a base with upturned sides, a U-shaped striking member with outturned ends pivoted in said upturned sides; a spring stretched between the crosspiece of said U-shaped striking member and said base; and a trip for said striking member formed as a platform with an upturned end and outwardly extending lugs on opposite sides thereof by which said platform is suspended above said base, said platform having a slot to allow said spring to pass through.

MICHAEL BILINSKI.